United States Patent
Wünning et al.

(10) Patent No.: US 10,830,432 B2
(45) Date of Patent: Nov. 10, 2020

(54) DEVICE AND METHOD FOR HEATING FURNACES BY MEANS OF RADIANT TUBES

(71) Applicant: WS-Wärmeprozesstechnik GmbH, Renningen (DE)

(72) Inventors: Joachim G. Wünning, Leonberg (DE); Joachim A. Wünning, Leonberg (DE)

(73) Assignee: WS-Wärmeprozesstechnik GmbH, Renningen (DE)

( * ) Notice: Subject to any disclaimer, the term of this patent is extended or adjusted under 35 U.S.C. 154(b) by 58 days.

(21) Appl. No.: 16/098,766

(22) PCT Filed: Apr. 28, 2017

(86) PCT No.: PCT/EP2017/060155
§ 371 (c)(1),
(2) Date: Nov. 2, 2018

(87) PCT Pub. No.: WO2017/191040
PCT Pub. Date: Nov. 9, 2017

(65) Prior Publication Data
US 2019/0120483 A1 Apr. 25, 2019

(30) Foreign Application Priority Data
May 4, 2016 (EP) .................................... 16168425

(51) Int. Cl.
*F23C 3/00* (2006.01)
*F23N 5/02* (2006.01)

(52) U.S. Cl.
CPC ................ *F23C 3/002* (2013.01); *F23N 5/02* (2013.01); *F23C 2900/99001* (2013.01);
(Continued)

(58) Field of Classification Search
CPC ........... F23C 2900/99001; F23C 3/002; Y02E 20/342; F23D 14/12; F27D 99/0035
See application file for complete search history.

(56) References Cited

U.S. PATENT DOCUMENTS 5,154,599 A 10/1992 Wuenning
5,570,679 A 11/1996 Wunning
(Continued)

FOREIGN PATENT DOCUMENTS

DE 10217524 B4 10/2005
EP 0463218 A1 1/1992
(Continued)

OTHER PUBLICATIONS

International Search Report dated Jul. 28, 2017, for corresponding PCT Application No. PCT/EP2017/060155 (4 pgs.).
(Continued)

*Primary Examiner* — Jorge A Pereiro
(74) *Attorney, Agent, or Firm* — Fitch, Even, Tabin, & Flannery LLP

(57) ABSTRACT

To heat a furnace chamber (16) indirectly using radiant tubes (11) to (14), heating energy is transferred through the radiant tube wall into the furnace chamber (16). During steady-state operation, the temperature in the radiant tube (11) to (14) and on its surface is higher than the furnace, depending on the specific heat output of the radiant tube (11) to (14). At a furnace temperature of 770° C. and a heat output of 50 kW/m2, the radiant tube has a temperature of 900° C. The radiant tube (11) to (14) can thus operate continuously with flameless oxidation at this output, even though the temperature in the furnace is only 100° C. However, if the radiant tube (11) to (14) has cooled to the furnace temperature of 770° C. during a break in burning, deflagration is avoided when the associated burner is ignited by initially operating said burner with a flame for a few seconds.

12 Claims, 2 Drawing Sheets

(52) U.S. Cl.
CPC ............... *F23K 2900/05003* (2013.01); *F23N 2237/10* (2020.01); *Y02E 20/342* (2013.01)

(56) References Cited

U.S. PATENT DOCUMENTS

| | | | |
|---|---|---|---|
| 10,288,285 B2 | 5/2019 | Ageno et al. | |
| 2003/0037736 A1* | 2/2003 | Wunning | B01J 19/0013 122/511 |
| 2004/0091830 A1 | 5/2004 | Wunning | |
| 2006/0199127 A1* | 9/2006 | Butler | F23C 3/002 431/215 |
| 2006/0222578 A1* | 10/2006 | Veenstra | C07C 45/33 422/198 |
| 2007/0037107 A1 | 2/2007 | von Schweinitz et al. | |
| 2007/0072141 A1* | 3/2007 | Daneri | F23D 14/22 431/329 |
| 2008/0253430 A1* | 10/2008 | Ekman | G01K 7/42 374/166 |
| 2009/0136406 A1 | 5/2009 | Johnson et al. | |
| 2009/0148799 A1* | 6/2009 | Ekman | F23D 14/32 431/8 |
| 2010/0092897 A1 | 4/2010 | Wuenning | |
| 2012/0315584 A1* | 12/2012 | Astesiano | F23C 6/047 431/2 |
| 2013/0157204 A1 | 6/2013 | Hong | |
| 2013/0260323 A1* | 10/2013 | Hong | F23N 5/00 431/6 |
| 2014/0080072 A1* | 3/2014 | Smirnov | F23L 15/04 431/6 |
| 2016/0245514 A1* | 8/2016 | Ageno | F23L 15/02 |
| 2016/0305661 A1* | 10/2016 | Newby | F23N 1/022 |

FOREIGN PATENT DOCUMENTS

| | | |
|---|---|---|
| EP | 0685683 A2 | 12/1995 |
| EP | 1893915 B1 | 8/2011 |
| EP | 1995515 B1 | 10/2013 |
| EP | 2778521 B1 | 7/2018 |

OTHER PUBLICATIONS

European Search Report dated Nov. 14, 2016, for corresponding EP Application No. 16168425 (7 pgs.).

European Notice of Opposition dated Apr. 16, 2020, in corresponding European Application No. 16168425.3, with machine English translation (55 pages).

Joachim G. Wünning et al., Handbuch der Brennertechnik für Industrieöfen: Grundlagen, Brennertechniken, Anwendungen. Germany, Vulkan-Verlag, 2007. (13 pages).

* cited by examiner

DEVICE AND METHOD FOR HEATING FURNACES BY MEANS OF RADIANT TUBES

CROSS REFERENCE TO RELATED APPLICATIONS

This patent application is the national phase of PCT/EP2017/060155, filed Apr. 28, 2017.

TECHNICAL FIELD

The invention relates to a furnace heating device and a method for igniting burners designed for flameless oxidation in order to heat intermittently operated radiant tubes.

BACKGROUND

Document EP 0 463 218 A1 discloses the operation of burners with flameless oxidation. This operation is based on injecting a pre-heated fuel-air mixture at high speed into a waste gas recirculation eddy. A combustion chamber is used to heat the burner and is operated with a flame. Once the operating temperature has been reached, it is possible to switch over to flameless oxidation.

Furthermore, document DE 102 17 524 B4 discloses the heating of radiant tubes by means of burners which operate with flameless oxidation. Burners of this kind are also designed to assume an operating mode with flame in the heating phase.

Lastly, document EP 1 995 515 B1 discloses a burner for heating furnace chambers by means of flameless oxidation, in which the operating temperature is below a limit temperature necessary for the flameless oxidation. To this end, hot gases are generated by means of a steadily burning flame and are used to assist and maintain the otherwise flameless oxidation.

Radiant tubes are typically used for indirect heating of industrial furnaces for temperatures up to approximately 1200° C. In order to dissipate radiant heat, the radiant tubes are heated from the inside, wherein the radiant tube can be heated by flameless oxidation, which significantly reduces the nitrogen oxides in the waste gas.

If the temperature of the industrial furnace is controlled by switching individual radiant tubes or entire radiant tube groups on and off, the radiant tubes must be switched on and off whilst still warm from operation. In the case of the heat treatment of steel or other materials, the furnace temperature during operation is for example less than 850° C., depending on the application. Furnace temperatures of this kind, which are typically below 900° C., but significantly above 700° C., can be produced by radiant tubes. However, if the radiant tubes are heated by burners with a flame and if the process is performed with high air preheating (in particular preheating to more than 500° C.) for energy conservation reasons, the resultant nitrogen oxide values are unacceptably high. The operation of the burners with flameless oxidation by contrast leads to lower nitrogen oxide values, wherein according to experience, in the case of furnaces heated by means of radiant tube, a furnace operating temperature of at least 850° C. is necessary in order to be able to reliably put a burner into operation with flameless oxidation. If the furnace temperature is lower, however, deflagrations can occur in the event of intermittent operation, i.e. switching on and off of burners for output regulation. In this regard, furnace operating temperatures below 850° C. (but above 700° C.) can be considered critical for intermittent flameless burner operation (flameless pulsed burning).

The object of the invention is to specify a concept with which radiant tubes can be reliably operated with flameless pulsed burning at critical furnace temperatures.

SUMMARY

The furnace heating device according to the invention comprises at least one radiant tube, preferably a plurality of radiant tubes, which can be heated in each case by means of a burner (at least one burner), which in a first operating mode can be operated with flame and in a second operating mode can be operated without flame, i.e. with flameless oxidation. The interior of the radiant tube is preferably sealed off with respect to the furnace chamber. At least one control device is provided, by means of which the burner or the burners of the radiant tubes can be switched on and off and can be switched over between the first and the second operating mode. The temperature of the interior of the radiant tube in the case of an active burner is greater than the temperature of the furnace chamber. During breaks in operation, which occur repeatedly in the case of pulsed burning, the temperature in the interiors of the radiant tubes approaches the furnace temperature from above.

In accordance with the invention the control device is designed to operate the burner temporarily in the first operating mode and then in the second operating mode in the event of a warm start, i.e. in the case of a furnace that is at operating temperature. If the burner of the radiant tube is clocked, i.e. is operated with what is known as pulsed burning, the burner must be reliably started again and again. This is achieved in each case preferably by ignition of a flame which burns for a few seconds. In spite of a relatively low (critical) furnace operating temperature, the temperature of the interior of the radiant tube can thus rise for example from merely 800° C. to a temperature above 850° C., for example 900° C., and is then switched over reliably into the flameless operating mode.

Below the fuel-dependent critical temperature $T_k$ of the furnace chamber, above which the burner can be readily operated in flameless operation and also ignited, there is a critical temperature range within which the burner still can be operated flamelessly in the radiant tube. A temperature gradient from the radiant tube interior to the furnace chamber is thus created, such that the radiant tube inner temperature is reliably above the critical temperature $T_k$. However, within the critical temperature range there is a risk of deflagration in the case of flameless burner ignition. In accordance with the invention a short flame lasting for a few seconds is ignited in this critical temperature range so as to then transition immediately into flameless operation.

The furnace heating device can comprise a device for at least local detection of the furnace temperature, for example in the form of one or more switching temperature sensors. If a temperature sensor of this kind is arranged at a point of an industrial furnace, it determines the switching on and off of burners on the basis of the furnace temperature, but not on the basis of the burner temperature. In the case of burners operated in groups, it can therefore be that individual burners have a temperature that readily initiates flameless oxidation when a burner is started, whereas others are not suitable for this purpose. Due to the unfailing ignition of the burners temporarily in the first operating mode and the subsequent switchover to the second operating mode, however, all burners are reliably ignited, and deflagrations are avoided. The temporary operation in the first operating mode in the case of a warm start is a safety operating phase for the purpose of avoiding deflagration.

The period of time for operation of the burner in the first operating mode is preferably a few seconds, for example 5 s or 3 s. The nitrogen oxides created are negligible due to the short period of time.

In accordance with the invention the burner for heating the radiant tube when the furnace is hot, after a break in burning when the operating temperature of the furnace is below a temperature limit for flameless oxidation, is ignited in a first operating mode with flame (safety operating mode) and shortly thereafter is switched over to the second operating mode with flameless oxidation, regardless of the furnace temperature still below the temperature limit.

Should the temperature in the furnace chamber drop below the lower temperature $T_u$ during a break in operation of the burner, the burner is ignited in a cold-start operating mode and the flame at the burner is maintained until the temperature in the furnace chamber reaches the lower temperature again.

In a refined embodiment it is possible to define the length of the period of time for the first operating mode on the basis of the detected furnace temperature. This can be implemented for example by means of multiple switching temperature sensors in stages or also continuously.

BRIEF DESCRIPTION OF THE DRAWINGS

Details of advantageous developments of the invention are the subject of the drawing of the description or claims. In the drawings:

DETAILED DESCRIPTION

Figure 1:
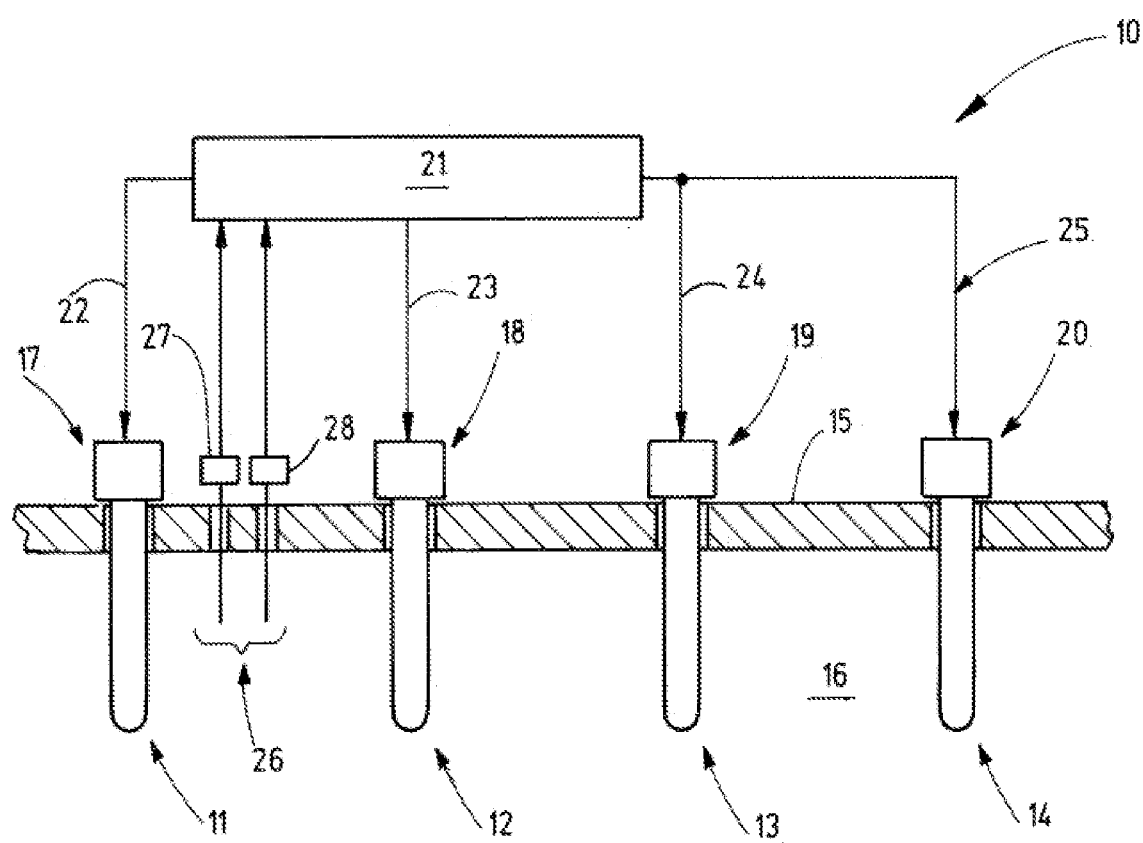
FIG. 1 shows a furnace heating device with a plurality of radiant tubes for operation with pulsed burning, in a heavily schematised depiction.

A furnace heating device 10 is shown in FIG. 1 and comprises at least one, preferably a plurality of radiant heating tubes 11 to 14, which are referred to throughout this document as "radiant tubes" for short. These protrude from a furnace wall 15 into a furnace chamber 16, in order to heat goods (not shown in further detail) located therein, primarily by radiant heat.

The radiant tubes 11 to 14 are heated by burners 17, 18, 19, 20 depicted merely symbolically in FIG. 1, which burners preferably work in a gas-operated manner and heat the radiant tubes 11 to 14 from the inside. The burners 17 to 20 are used to heat the interiors of the radiant tubes 11 to 14 and for this purpose are arranged at an open end of each radiant tube 11 to 14, the other end of said radiant tubes preferably being closed. However, designs are also possible in which a burner is arranged at both ends of a radiant tube. The radiant tubes 11 to 14, as shown, can be elongate and straight or can have one or more loops. Their interior is separated from the furnace chamber 16 by the radiant tube wall.

Each burner 17 to 20 comprises heat recovery devices, for example in the form of recuperators and/or generators, in order to use waste gas heat in order to preheat combustion air (and fuel). The burners 17 to 20 preferably work with high air preheating, such that the air fed for combustion has a temperature of more than 500° C. The air, gas and waste gas lines and control members arranged therein, for example valves, are not shown separately in FIG. 1.

The burners 17 to 20 can be operated in a first operating mode F, in which they form a flame. This operating mode is used for a cold start, i.e. for heating operation of the radiant tubes 11 to 14 and of the furnace chamber. Once the furnace chamber has been heated to at least a temperature $T_u$, the burners 17 to 20 operated up to this point in the first operating mode F are switched over to a second operating mode NF without flame (operation with flameless oxidation FLOX®). The second operating mode NF is characterised by a particularly low level of NOx production.

Figure 3:
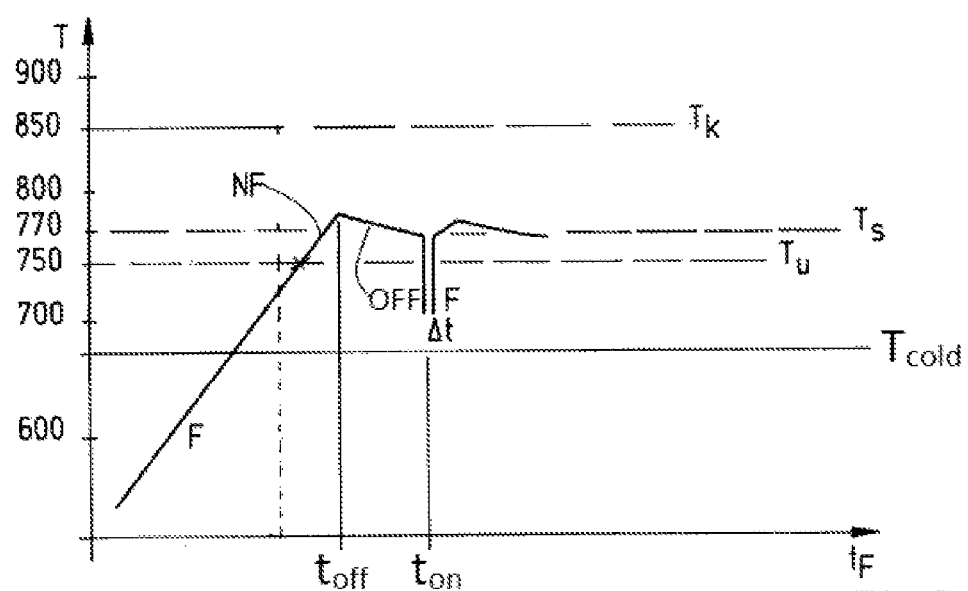
FIG. 3 shows temperature limits for operation of a radiant tube in the form of a graph.

The lowest temperature $T_u$ of the furnace chamber at which the burners can be operated in the second operating mode NF is dependent on the burner output and thus on the temperature reached with operating burners in the radiant tube interior. The lowest temperature $T_u$ of the furnace chamber at which FLOX® operation, i.e. operation in the second operating mode NF, is possible can be 750° C., for example (FIG. 3).

In order to switch the burners 17 to 20 on and off and in order to switch the burners 17 to 20 over from the first operating mode F into the second operating mode NF (or vice versa), a control device 21 is provided. The control device controls the operation of the group formed by the burners 17 to 20, as indicated by arrows 22, 23, 24, 25, so as to switch said burners on and off jointly (i.e. simultaneously) in order to hold the temperature of the furnace chamber 16 at the setpoint temperature $T_s$ of for example 770° C., for example during the course of two-step control. The temperature $T_s$ is slightly above the temperature $T_u$.

In order to detect the furnace temperature T, a temperature detection device 26 is provided, which has at least one, possibly also a plurality of temperature sensors 27, 28. The temperature sensors 27, 28 are preferably formed as temperature switches. For example, the temperature sensor 27 can be set to the desired furnace temperature $T_s$ and to this end can have a switching temperature of 770° C., for example. The temperature sensor 27 can be used to implement pulsed burning of the burners 17 to 20 in order to adjust the furnace temperature to the desired value.

The second temperature sensor 28 can be set to the lowest temperature $T_u$ at which an active burner can be switched over from the first operating mode F into the second operating mode NF. For example, it can have a switching temperature of 750° C.

The furnace heating device 10 described in this respect functions as follows:

In the case of a cold start shown on the left in FIG. 3, i.e. a start-up of the installation at a temperature $T_{cold}$ of the furnace chamber 16 in the region of ambient temperature or lower, but in any case below the temperature $T_u$, the control device 21 starts all burners 17 to 20 with a flame, i.e. in the first operating mode F, and heats the radiant tubes 11 to 14 and therefore the furnace chamber 16. This process can take up a significant amount of time, which typically lasts longer than several minutes. As soon as it is detected that the temperature $T_u$ has been reached for example by means of the temperature sensor 28, with flameless operation being possible at this temperature, the control device 21 switches the burners 17 to 20 into this operating mode NF. In this operating mode NF the heating is continued until the setpoint temperature $T_s$ is reached or exceeded. From the furnace temperature $T_u$ at the burner, i.e. in their interiors, the radiant tubes 11 to 14 have a temperature at which flameless operation is possible, for example a temperature that lies above the critical temperature $T_k$ of for example 850° C.

Figure 4:
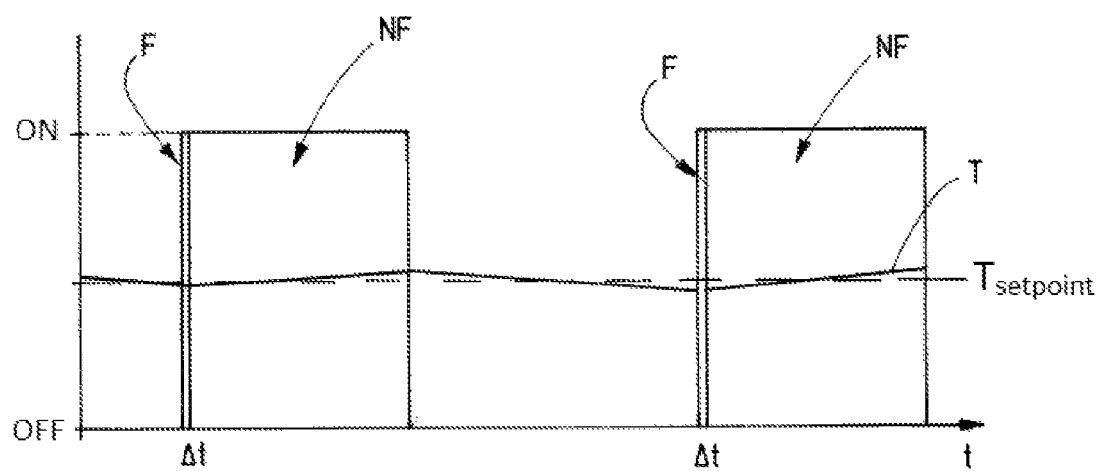
FIG. 4 shows a graph for illustrating the pulsed operation of radiant tubes.
Figure 5:
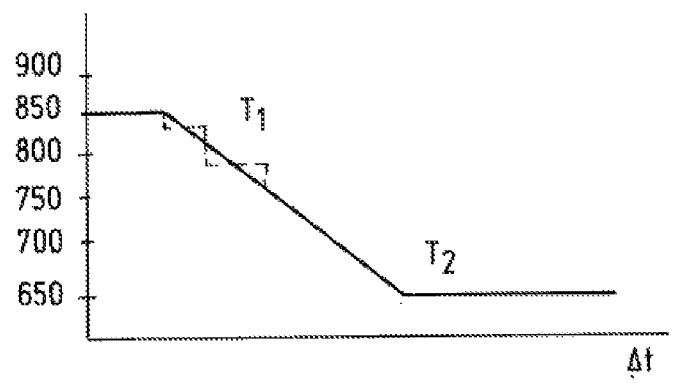
FIG. 5 shows temperature-dependent periods of time for the first operating mode in the form of a graph.

If the furnace chamber 16 is heated to the setpoint temperature $T_s$, for example 770° C., this temperature $T_s$ is maintained by pulsed burning operation of the burners 17 to 20. For example, the temperature sensor 27 switches on and off with a certain hysteresis as the operating temperature is exceeded and undershot, i.e. it outputs a switching signal to the control device 21. This control device adjusts the temperature in the furnace chamber 16 by switching the burners 17 to 20 on and off accordingly. FIG. 3 and in particular FIG. 4 illustrate this operation. The control device 21 switches the burners 17 to 20 on as soon as the setpoint temperature $T_s$ is undershot. The burners 17 to 20 are by contrast switched off when the setpoint temperature $T_s$ is exceeded. The actual temperature T of the furnace chamber 16 thus oscillates around the temperature $T_s$ in accordance with the switching hysteresis.

Although the furnace temperature in the case of pulsed burning operation lies at or above the lowest temperature $T_u$ (for example 750° C.) at which flameless operation FL is possible and at which a switchover is made during heating from flame operation (first operating mode F) to flameless operation (second operating mode NF), the burners 17 to 20 are operated in the first operating mode F with a flame when switched on again, in each case for a short time $\Delta t$. The burners 17 to 20 can thus be ignited without deflagration, even if the radiant tubes 11 to 14 have a temperature lower than the critical temperature $T_k$ (typically 850° C.). Once the period of time $\Delta t$ has elapsed, the control device 21 switches over the burners 17 to 20 to flameless operation NF.

Figure 2:
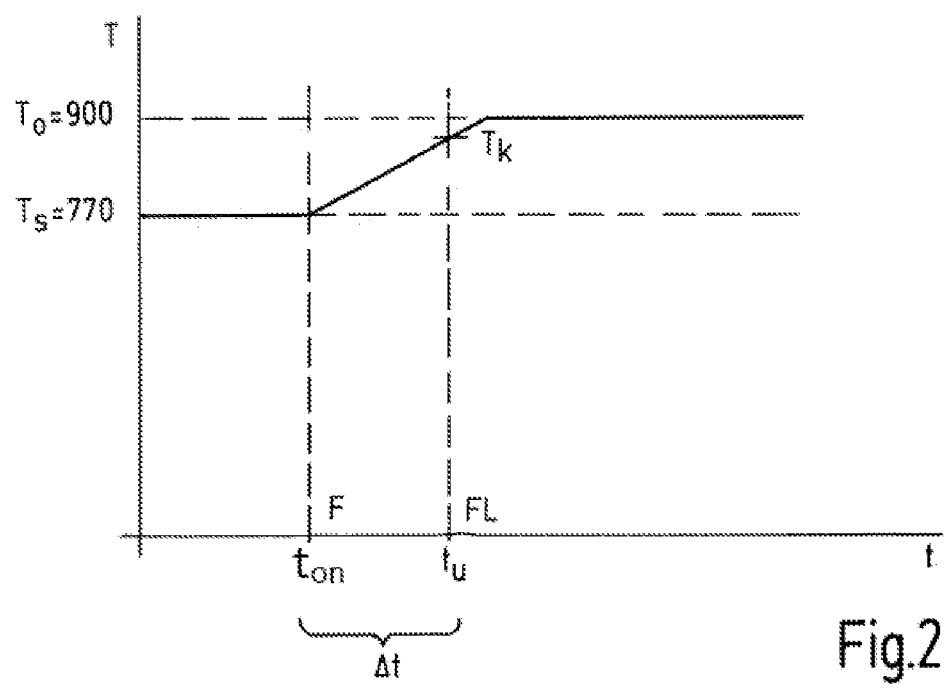
FIG. 2 shows temperature conditions in a radiant tube with ignition of a radiant tube working in pulsed operation.

This process is illustrated again in FIG. 2. If the burners are ignited at a temperature $T_s$ of for example 770° at the moment in time $T_{on}$, the temperature T within the radiant tube 11 starts to rise quickly, such that it exceeds a critical value $T_k$ of typically 850° C. after just a few seconds. Once the period of time $\Delta t$ has elapsed, a transition is therefore made to flameless operation FL at a moment in time $t_u$ after the time $t_{on}$. This operation is maintained until the control device 21 switches off the burners 17 to 20 again, for example on account of a switching signal of the temperature sensor 27, which signals that the temperature $T_s$ has been exceeded. The burners 17 to 20 are then inactive for a certain time, whereby the radiant tubes 11 to 14 cool again to furnace temperature (for example 770° C.). If the furnace temperature $T_s$ is undershot, the temperature sensor 27 communicates again and prompts the control device 21 to switch on the burners 17 to 20 again. This is implemented again with a first operating mode F for a period of time $\Delta t$, after which a transition is made to the operating mode NF.

The furnace heating device 10 described in this regard has at least two operating modes, specifically heating of the radiant tubes 11 to 14 with the burners 17 to 20 in the first operating mode F, and control operation, by means of pulsed burning, in which the burners 17 to 20 are switched on and off in a pulsed manner in order to maintain a desired furnace temperature $T_s$. The furnace temperature $T_s$ in the case of control operation lies below a critical temperature $T_k$ suitable for flameless oxidation. This temperature $T_k$ is dependent on the used fuel, and in the case of natural gas is approximately 850° C. In the case of control operation (pulsed burning operation), the burners 17 to 20 are therefore always ignited in a starting sequence, in which the burners 17 to 20 are ignited at the start in the first operating mode F for a short period of time $\Delta t$, wherein a transition is made to the second operating mode NF with flameless oxidation once the period of time $\Delta t$ has elapsed. In this way, the furnace chamber 16 can be operated at moderate operating temperatures $T_s$ of less than $T_k$ with high air preheating and therefore improved energy utilisation alongside low nitrogen oxide emissions.

It is possible to specify the period of time $\Delta t$ as a fixed value, as is shown in FIG. 3. If the burner is ignited when the furnace is cold (for example below T=600° C.), it firstly operates with a flame, i.e. in the first operating mode F. If the furnace temperature reaches the temperature $T_u$, the burner is switched over into the second operating mode NF and continues to operate without flame. If the furnace temperature T exceeds the setpoint temperature $T_s$, the burner is switched off at the time $t_{off}$. As soon the furnace temperature T noticeably falls below the setpoint temperature $T_s$, the burner is switched on again at the time $t_{on}$. The burner is ignited here at a furnace temperature T below the critical temperature $T_k$. To this end, the burner is firstly operated in the first operating mode F with a flame for a period of time $\Delta t$. Once this fixed or variable period of time $\Delta t$ has elapsed, a transition is made into the second operating mode NF.

Although the burner when switched on again is thus ignited at a furnace temperature T, which is above the temperature $T_u$ at which a transition was made after the cold start from the first operating mode F to the second operating mode NF, the burner when switched back on is now ignited firstly in the first operating mode F and is then switched over to the second operating mode NF only after a few seconds.

Alternatively or additionally, further temperature sensors can be provided. For example, a temperature sensor for temperatures in the furnace chamber 16 above 850° C. can send a signal to the control device 21, so that said control device starts the burners immediately in the second operating mode NF without switching them first into a first operating mode F.

A further possible modification or development of the principle according to the invention is possible in that the period of time $\Delta t$ for which the burners 17 to 20 are operated in the first operating mode F with flame in the case of each start, in accordance with FIG. 4, is dependent on the furnace chamber temperature. For example, the period of time $\Delta t$ between a first temperature limit $T_1$, above which the burners 17 to 20 can be ignited directly in the second operating mode NF without deflagration, and a second temperature limit $T_2$, below which operation of the burners 17 to 20 in flameless operation, i.e. in the second operating mode NF, is not possible, can be variable. Above the temperature limit $T_1$, the period of time $\Delta t$ is equal to zero. Below the temperature limit $T_2$, the period of time $\Delta t$ is great or is not fixed. Between the temperature limits $T_1$, $T_2$ a functional profile for the period of time $\Delta t$ can be specified, within the scope of which the period of time $\Delta t$ decreases towards higher temperatures. The functional profile can run continuously or, as shown by way of dashed lines, also in one or more steps. A linear profile is possible.

To heat a furnace chamber 16 indirectly using radiant tubes 11 to 14, heating energy is transferred through the radiant tube wall into the furnace chamber 16. During steady-state operation, the temperature in the radiant tube 11 to 14 and on the surface thereof is higher than the furnace, said higher temperature depending on the specific heat output of the radiant tube 11 to 14. At a furnace temperature of for example 770° C. ($<T_k$) and a heat output of 50 kW/m², the radiant tube has an inner temperature of 900° C. ($>T_k$). The fuel-dependent critical temperature $T_k$ from which flameless oxidation is possible can be 850° C., for example. The radiant tube 11 to 14 can thus operate continuously with flameless oxidation at this output, even though the temperature in the furnace is only 770° C. ($<T_k$). However, if the radiant tube 11 to 14 has cooled to a temperature below $T_k$ during a break in burning, deflagration is avoided when the associated burner is ignited by initially operating said burner with a flame (operating mode F) for a few seconds, before a transition is made to operating mode NF.

REFERENCE SIGNS

| | |
|---|---|
| 10 | furnace heating device |
| 11-14 | radiant heating tubes/radiant tubes |
| 15 | furnace wall |
| 16 | furnace chamber |
| 17-20 | burner |
| 21 | control device |
| 22-25 | arrows |
| 26 | temperature detection device |
| 27, 28 | temperature sensors |
| F | first operating mode, burner with flame |
| NF | second operating mode, flameless oxidation |
| T | temperature |
| t | time |

The invention claimed is:

1. A furnace heating device, for the heat treatment of goods in a furnace chamber (16), comprising:
at least one radiant tube (11), configured to heat the furnace chamber (16) and which can be heated using a burner (17), which can be operated in a first operating mode (F) with a flame and in a second operating mode (NF) with flameless oxidation,
at least one control device (21), configured to control on and off states and an operating mode setting for the burner (17) of the radiant tube (11),
wherein the at least one control device (21) is configured to fix the temperature (T) of the furnace chamber (16) to a setpoint temperature ($T_s$), which lies below a critical temperature ($T_k$), which must at least be present in a combustion chamber for flameless oxidation of the used fuel, but lies above a lower temperature ($T_u$), at which the burner (17) of the radiant tube (11) can be operated in a flameless manner,
wherein the at least one control device (21) is designed to operate the burner (17) in the second operating mode (NF) at a temperature (T) of the furnace chamber (16) lying above the lower temperature ($T_u$) and below the critical temperature ($T_k$);
wherein the control device (21) is designed to identify a warm start only if the temperature (T) of the furnace chamber (16) lies below the critical temperature limit ($T_k$), but above the lower temperature ($T_u$);
wherein the control device (21) is designed to operate the burner (17) in the first operating mode (F) for a period of time (Δt) only in case of a warm start;
wherein the period of time (Δt) is fixed.

2. The furnace heating device according to claim 1, wherein the control device (21) is designed, at start-up and with a temperature (T) of the furnace chamber (16) below the critical temperature ($T_k$), but above the temperature ($T_u$), to ignite the burner (17) initially in the first operating mode (F) and to operate the burner (17) in said mode for the period of time (Δt) and to then operate the burner (17) in the second operating mode (NF).

3. The furnace heating device according to claim 1, wherein the control device (21) is designed to switch the burner (17) between the on and off states in order to adjust the temperature of the furnace chamber (16).

4. The furnace heating device according to claim 1, further comprising a device (26) configured to detect the furnace temperature at least locally and that is connected to the control device (21).

5. The furnace heating device according to claim 4, wherein the device (26) comprises at least one switching temperature sensor (27).

6. The furnace heating device according to claim 4, wherein the device (26) is arranged outside the radiant tube (11), at a distance therefrom.

7. The furnace heating device according to claim 1, wherein the period of time (Δt) is fixed depending on the temperature (T) of the furnace chamber (16).

8. A method for igniting burners (17) for heating intermittently operated radiant tubes (11) in a warm start mode following a break in burning when the furnace is hot, in which the operating temperature (T) of the furnace lies below a critical temperature ($T_k$), which at least must be present in a furnace chamber for flameless oxidation of the used fuel, but above a lower temperature ($T_u$) at which the burner (17) of the radiant tube (11) can be operated in a flameless manner, wherein the method comprises: igniting the burner (17) in a first operating mode (F), in which it functions with flame, and switching the burner (17) over to a second operating mode (NF) with flameless oxidation, regardless of the furnace temperature (T) still lying below the temperature limit ($T_k$);
identifying a warm start only if the temperature (T) of the furnace chamber (16) lies below the critical temperature limit ($T_k$), but above the lower temperature ($T_u$);
operating the burner (17) in the first operating mode (F) for a period of time (Δt) only in case of a warm start;
wherein the period of time (Δt) is fixed.

9. The method according to claim 8, further comprising:
igniting the burner (17), in the cold-start mode, with a temperature of the furnace chamber (16) below the lower temperature ($T_u$), with a flame in the first operating mode (F), and
switching the burner (17) over to the second operating mode (NF) without flame in response to the temperature (T) of the furnace chamber (16) exceeding the lower temperature ($T_u$).

10. The method according to claim 8, further comprising operating the burner (17) in pulsed burning operation in order to adjust the temperature (T) of the furnace chamber to a desired temperature ($T_s$).

11. The method according to claim 10, wherein the desired temperature ($T_s$) of the furnace chamber (16) lies above the lower temperature ($T_u$), but below the critical temperature ($T_k$).

12. The method according to claim 8, wherein the period of time (Δt) is fixed depending on the temperature (T) of the furnace chamber (16).

* * * * *